(12) United States Patent
Somech et al.

(10) Patent No.: US 10,963,378 B2
(45) Date of Patent: Mar. 30, 2021

(54) DYNAMIC CAPACITY ALLOCATION OF STRIPES IN CLUSTER BASED STORAGE SYSTEMS

(71) Applicant: International Business Machines Corporation, Armonk, NY (US)

(72) Inventors: Ovadi Somech, Rishon LeZion (IL); Eran Tzabari, Tel-Aviv (IL); Ofer Peretz, Haifa Ha (IL); Boris Litvinov, Rishon Le Tzion (IL)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/358,039

(22) Filed: Mar. 19, 2019

(65) Prior Publication Data

US 2020/0301829 A1    Sep. 24, 2020

(51) Int. Cl.
*G06F 12/00* (2006.01)
*G06F 12/0802* (2016.01)
*G06F 3/06* (2006.01)

(52) U.S. Cl.
CPC ........ *G06F 12/0802* (2013.01); *G06F 3/0604* (2013.01); *G06F 3/067* (2013.01); *G06F 3/0655* (2013.01); *G06F 2212/60* (2013.01)

(58) Field of Classification Search
None
See application file for complete search history.

(56) References Cited

U.S. PATENT DOCUMENTS

| | | | |
|---|---|---|---|
| 9,021,229 | B2 | 4/2015 | Ananthanarayanan et al. |
| 9,460,185 | B2 | 10/2016 | Swift et al. |
| 2017/0235673 | A1 | 8/2017 | Patel et al. |
| 2018/0225174 | A1 | 8/2018 | Hayes et al. |

FOREIGN PATENT DOCUMENTS

| | | |
|---|---|---|
| CN | 102857577 A | 1/2013 |
| CN | 105630423 A | 6/2016 |

OTHER PUBLICATIONS

B.Po. Rimal et al., "A Taxonomy and Survey of Cloud Computing Systems", 2009 Fifth International Joint Conferenced on INC, IMS, and IDC., IEEE Computer Society, (year 2009) pp. 1-8.
Anonymous, "Collaboration between filesystem and storage controllers to improve performance and simplify deployment via enforced data striping", IP.Com, Jan. 30, 2013, pp. 1-6.

*Primary Examiner* — Daniel D Tsui
(74) *Attorney, Agent, or Firm* — Kunzler Bean & Adamson

(57) ABSTRACT

For dynamic capacity allocation of stripes in cluster-based storage system, a storage controller identifies a storage stripe in a cluster-based storage system that has a smallest stripe score of a plurality of storage stripes. The storage controller also identifies a storage stripe in the cluster-based storage system that has a largest stripe score of the plurality of storage stripes, and reallocates, in response to a difference between the largest stripe score and the smallest stripe score being less than a threshold value, free-space capacity from a donator stripe to a receiver stripe.

20 Claims, 8 Drawing Sheets

DYNAMIC CAPACITY ALLOCATION OF STRIPES IN CLUSTER BASED STORAGE SYSTEMS

FIELD

The subject matter disclosed herein relates to data storage and more particularly relates to storage area networks that implement dynamic capacity allocation of stripes in cluster-based storage systems.

BACKGROUND

Today with modern technology, large volumes of data are storable on disk drives; these drives can exist as a solo entity, or as part of a broader make up within a larger storage environment, for example as part of a Storage Area Network (SAN). As the sheer volume of data in today's information-based society continues to increase, so too does the demand placed on communications and data processing infrastructures that serve to manipulate, transfer, and otherwise handle this data.

A common method of managing storage capacity of cluster-based storage systems is to segment the storage devices into different stripes. Each stripe is managed as a single independent storage entity, and the system used capacity is generally calculated by the stripe with the most amount of used storage space. However, because the total utilization is calculated based on the "busiest" stripe, or most utilized stripe, the total utilization may be wildly inaccurate as well as other system properties such as data reduction ratios reports (i.e., the ratio between the amount of data written to the system and the size that data actually occupies on a physical storage device).

BRIEF SUMMARY

A method for dynamically allocating free-space capacity from a donator stripe to a receiver stripe in cluster-based storage systems is disclosed. An apparatus and computer program product also perform the functions of the method. In certain embodiments, the method includes identifying a storage stripe in a cluster-based storage system having a smallest stripe score of a plurality of storage stripes. The method may also include identifying a storage stripe in the cluster-based storage system having a largest stripe score of the plurality of storage stripes. In certain embodiments, the method includes reallocating, in response to a difference between the largest stripe score and the smallest stripe score being less than a threshold value, free-space capacity from a donator stripe to a receiver stripe.

In certain embodiments, the method also includes generating a stripe score for each of the plurality of storage stripes. The stripe score of each of the plurality of storage stripes may be based on a quantity of movable free-space capacity and non-movable free-space capacity and may be based on a quantity of storage units. In certain embodiments, the threshold value is two.

The method may include generating and sorting a stripe map comprising a plurality of stripe scores, where each of the plurality of stripe scores corresponds to one of the plurality of storage stripes. The method also includes, in certain embodiments, maintaining a worst-stripe indicator that identifies a first stripe in the stripe map having the smallest stripe score, a minimal-free-stripe-capacity indicator that identifies a first stripe that is suitable to be selected as a donator stripe in response to the first stripe having movable free-space capacity, and a capacity-limit indicator that identifies a first stripe in the stripe map that is suitable to be selected as a receiver stripe.

BRIEF DESCRIPTION OF THE DRAWINGS

In order that the advantages of the embodiments of the invention will be readily understood, a more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
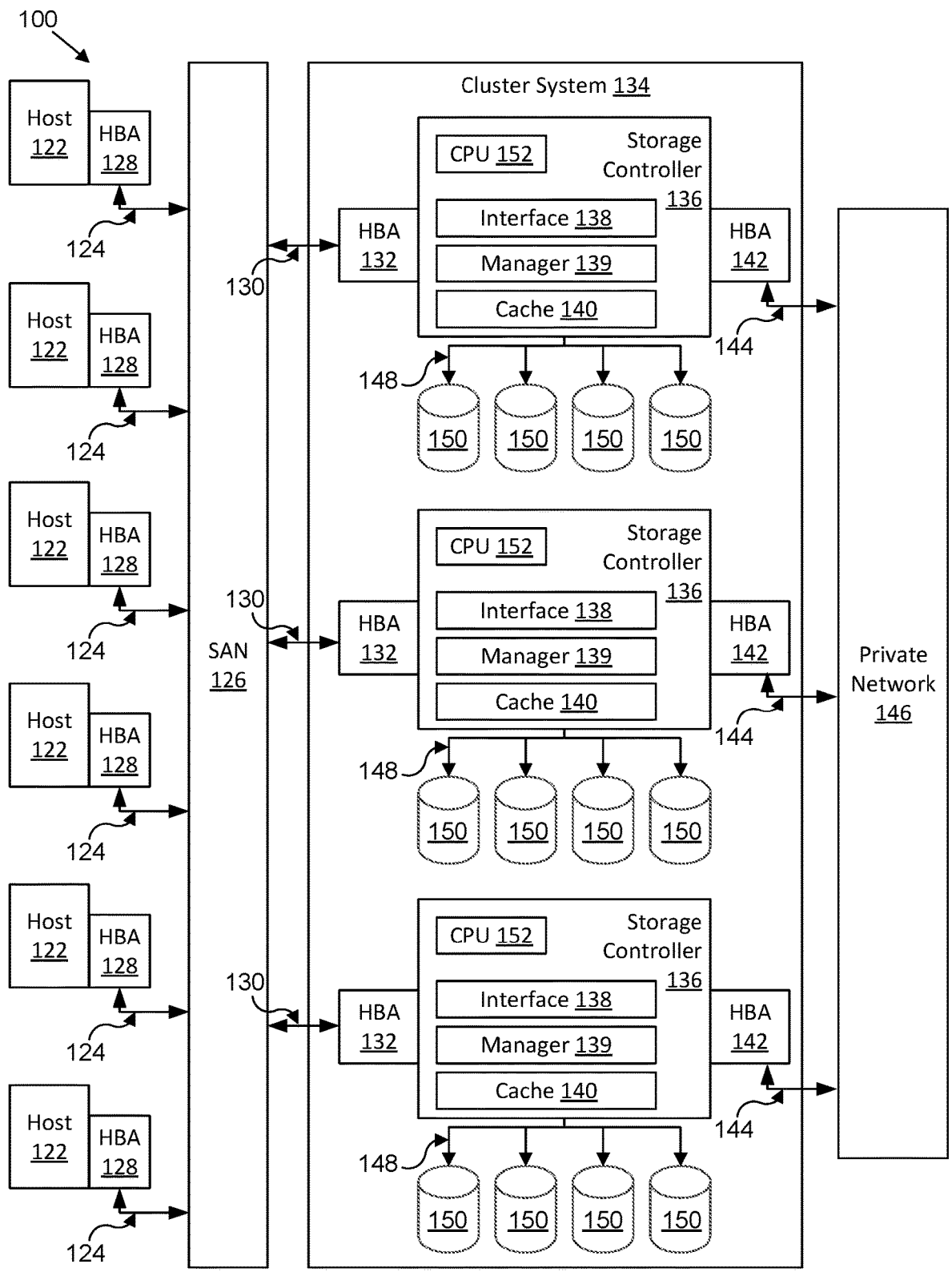
FIG. 1 is a schematic block diagram that illustrates one embodiment of a storage system 100 in accordance with embodiments of the present disclosure.

Disclosed herein are various embodiments providing methods, systems, and computer program products that can dynamically allocate free-space capacity from a donator stripe to a receiver stripe in cluster-based storage systems. A storage controller identifies a storage stripe in the cluster-based storage system that has a smallest stripe score and a storage stripe that has a largest stripe score, and reallocates, in response to a difference between the largest stripe score and the smallest stripe score being less than a threshold value, free-space capacity from a donator stripe to a receiver stripe.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

In addition, as used herein, the term "set" can mean "one or more," unless expressly specified otherwise. The term "sets" can mean multiples of or a plurality of "one or mores," "ones or more," and/or "ones or mores" consistent with set theory, unless expressly specified otherwise.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

The present technology may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory ("RAM"), a read-only memory ("ROM"), an erasable programmable read-only memory ("EPROM" or Flash memory), a static random access memory ("SRAM"), a portable compact disc read-only memory ("CD-ROM"), a digital versatile disk ("DVD"), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present technology are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the FIGs. illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

To more particularly emphasize their implementation independence, many of the functional units described in this specification have been labeled as modules. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program instructions may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

The schematic flowchart diagrams and/or schematic block diagrams in the Figures illustrate the architecture, functionality, and operation of possible implementations. It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Although various arrow types and line types may be employed in the flowchart and/or block diagrams, they are understood not to limit the scope of the corresponding embodiments. Indeed, some arrows or other connectors may be used to indicate only an exemplary logical flow of the depicted embodiment.

The description of elements in each figure may refer to elements of proceeding figures. Like numbers refer to like elements in all figures, including alternate embodiments of like elements.

FIG. 1 is a schematic block diagram that illustrates one embodiment of a storage system 100 in accordance with embodiments of the present disclosure. In certain embodiments, the storage system 100 includes a cluster system 134 having multiple storage controllers 136 configured to manage storage volumes for the storage system 100.

The cluster system 134 receives, from one or more host computers 122, input/output (I/O) requests, which are commands to read or write data at logical addresses on logical volumes. Any number of host computers 122 are coupled to the storage system 100 by any means known in the art, for example, using a network. Using the network, any host computer 122 can communicate a request to perform an I/O operation to the cluster system 134. Herein, by way of example, host computers 122 and the storage system 100 are assumed to be coupled by a Storage Area Network (SAN) 126 incorporating data connections 124 and Host Bus Adapters (HBAs) 128. The logical addresses specify a range of data blocks within a logical volume. For example, each block may contain 512 bytes, or 1024 bytes, etc. For example, a 10 KB data record used in a data processing application on a given host computer 122 that may require 20 blocks (depending on the block size), which the given host computer might specify as being stored at a logical address comprising blocks 1,000 through 1,019 of a logical volume. Storage system 100 may operate in, or as, a SAN system.

The cluster system 134 may be coupled between the SAN 126 and a private network 146 using data connections 130 and 144, respectively, and incorporating adapters 132 and 142, again respectively. In some configurations, adapters 132 and 142 may comprise host bus adapters (HBAs). The cluster system 134 implements multiple storage controller 136, each of which includes a processor 152, an interface 138 (in communication between adapters 132 and 142), a manager 139, and a cache 140. Each storage controller 136 is responsible for a number of storage devices 150 by way of a data connection 148 as shown. In embodiments of the present invention, the manager 139 includes at least one logical module that determines where to initially place volumes after implementing the selection criteria previously described.

Each storage controller 136 further comprises a given cache 140. However, it will be appreciated that the number of caches 140 used in the cluster system 134 may be any convenient number. While all caches 140 in the cluster system 134 may operate in substantially the same manner and comprise substantially similar elements, this is not a requirement. Each of the caches 140 may be approximately equal in size and is assumed to be coupled, by way of example, in a one-to-one correspondence with a set of physical storage devices 150, which may comprise disks. In one embodiment, physical storage devices may comprise such disks. Those skilled in the art will be able to adapt the description herein to caches of different sizes.

Each set of storage devices 150 comprises multiple slow and/or fast access time mass storage devices, herein below assumed to be multiple hard disks. FIG. 1 shows caches 140 coupled to respective sets of storage devices 150. In some configurations, the sets of storage devices 150 comprise one or more hard disks, or solid-state drives (SSDs) which can have different performance characteristics. In response to an I/O command, a given cache 140, by way of example, may read or write data at addressable physical locations of a given storage device 150. In the depicted embodiment, caches 140 are able to exercise certain control functions over storage devices 150. These control functions may alternatively be realized by hardware devices such as disk controllers (not shown), which are linked to caches 140.

Each storage controller 136 is operative to monitor its state, including the states of associated caches 140, and to transmit configuration information to other components of the cluster system 134 for example, configuration changes that result in blocking intervals, or limit the rate at which I/O requests for the sets of physical storage are accepted.

Routing of commands and data from HBAs 128 to the cluster system 134 and to each cache 140 may be performed over a network and/or a switch. Herein, by way of example, HBAs 128 may be coupled to storage controllers 136 by at least one switch (not shown) of the SAN 126, which can be of any known type having a digital cross-connect function. Additionally or alternatively, HBAs 128 may be coupled to storage modules 136.

In some embodiments, data having contiguous logical addresses can be distributed among storage controllers 136, and within the storage devices in each of the storage controllers 136. Alternatively, the data can be distributed using other algorithms, e.g., byte or block interleaving. In general, this increases bandwidth, for instance, by allowing a volume in a SAN or a file in network attached storage to be read from or written to more than one given storage device 150 at a time. However, this technique requires coordination among the various storage devices, and in practice may require complex provisions for any failure of the storage devices, and a strategy for dealing with error checking information, e.g., a technique for storing parity information relating to distributed data. Indeed, when logical unit partitions are distributed in sufficiently small granularity, data associated with a single logical unit may span all of the storage devices 150.

While such hardware is not explicitly shown for purposes of illustrative simplicity, the cluster system 134 may be adapted for implementation in conjunction with certain hardware, such as a rack mount system, a midplane, and/or a backplane. Indeed, the private network 146 in one embodiment may be implemented using a backplane. Additional hardware such as the aforementioned switches, processors, controllers, memory devices, and the like may also be incorporated into the cluster system 134 and elsewhere within storage system 100, again as the skilled artisan will appreciate. Further, a variety of software components, operating systems, firmware, and the like may be integrated into one storage system 100.

The storage devices 150 may comprise a combination of high capacity hard disk drives and solid-state disk drives. In some embodiments each of storage devices 150 may comprise a logical storage device. In storage systems implementing the Small Computer System Interface (SCSI) protocol, the logical storage devices may be referred to as logical units, or LUNs. While each LUN can be addressed as a single logical unit, the LUN may comprise a combination of high capacity hard disk drives and/or solid-state disk drives. While the configuration in FIG. 1 shows the cluster system 134 having three storage controllers 136 and each of those coupled to four storage devices 150, a given storage system 134 comprising any multiple of storage controllers 136 coupled to any plurality of storage devices 150 is considered to be with the spirit and scope of the present invention.

Figure 2:
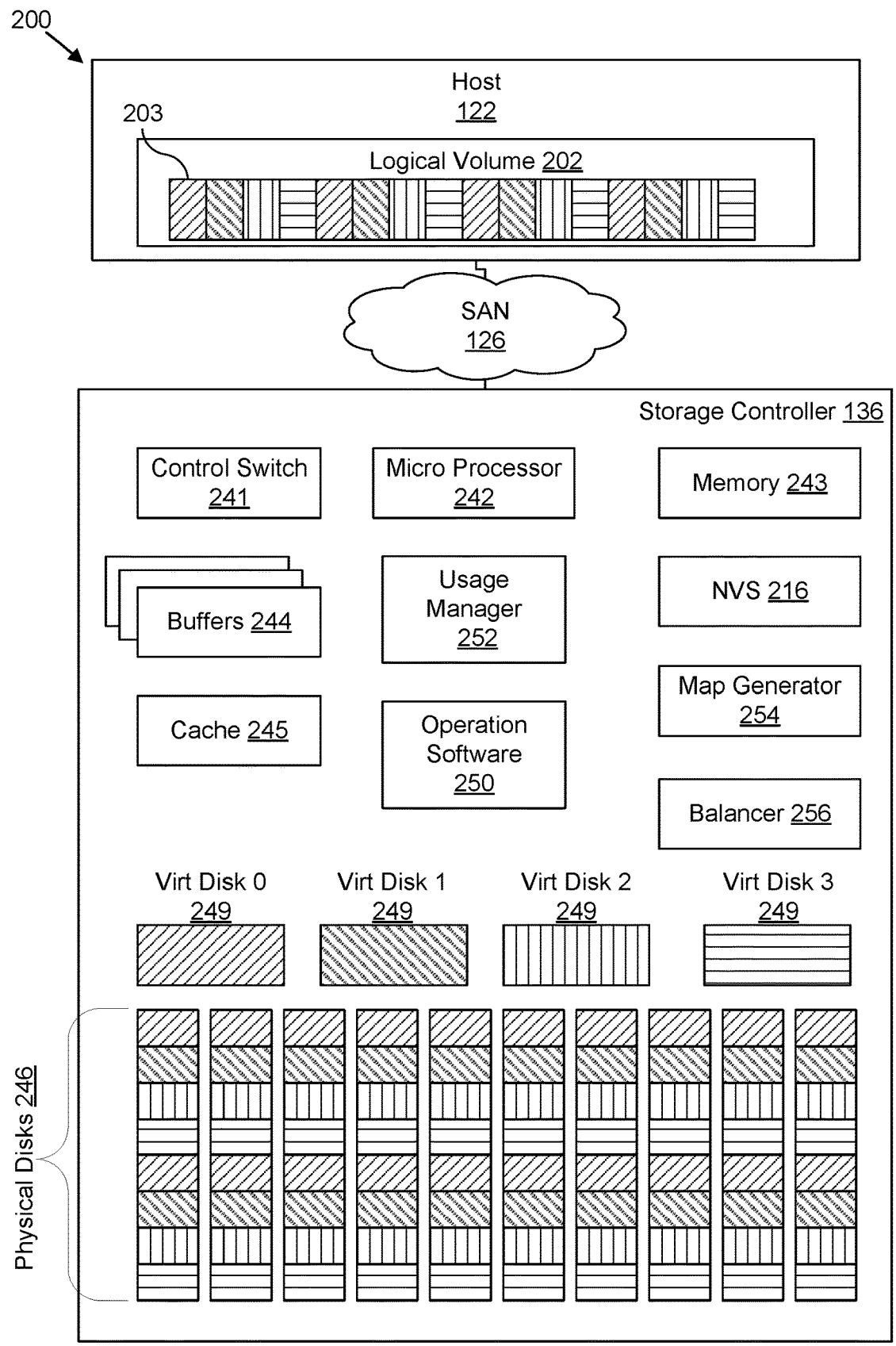
FIG. 2 is block diagram illustrating another embodiment of a system utilizing a communication system to access cluster-based storage systems in accordance with embodiments of the present disclosure.

FIG. 2 is block diagram illustrating another embodiment of a system 200 utilizing a communication system to access cluster-based storage systems in accordance with embodiments of the present disclosure. In particular, the system 200 includes a data storage and management system (specifically, portions of a SAN) that may be used in the overall context of mandatory atomic operations in accordance with the present invention. Information handling devices ("hosts") 122 are shown, each acting as a central processing unit for performing IO processing as part of the data storage system 200. The cluster hosts/nodes (physical or virtual devices) 122 may be one or more new physical devices or logical devices to accomplish the purposes of the present disclosure in the data storage system 200.

The data network (SAN 126) may be a fibre channel fabric, a fibre channel point to point link, a fibre channel over ethernet fabric or point to point link, a FICON or ESCON I/O interface, any other I/O interface type, a wireless network, a wired network, a LAN, a WAN, heterogeneous, homogeneous, public (i.e. the Internet), private, or any combination thereof. The hosts, 122 may be local or distributed among one or more locations and may be equipped with any type of fabric (or fabric channel) (not shown in FIG. 2) or network connection to the storage controller 136, such as Fibre channel, FICON, ESCON, Ethernet, fiber optic, wireless, or coaxial adapters. Data storage system 200 is depicted in FIG. 2 comprising storage controllers 136 and cluster hosts 122. The cluster hosts 122 may include cluster nodes and other network components known to one of ordinary skill in the art.

To facilitate a clearer understanding of the methods described herein, the storage controller 136 is shown in FIG. 2 as a single processing unit, including a microprocessor 242, system memory 243 and nonvolatile storage ("NVS") 216. It is noted that in some embodiments, the storage controller 136 may include multiple processing units, each with their own processor complex and system memory, and interconnected by a dedicated network within the system 200.

Physical storage devices 246 may be comprised of one or more storage devices, such as storage arrays. As described above with reference to FIG. 1, the cluster system may include multiple storage controllers, with each storage controller having multiple storage devices 246. In alternative embodiments, a single storage controller 136 may handle all of the i/o requests of the hosts 122. The storage devices 246 are controlled by the storage controller 136 via a data connection such as a communication bus. While one data connection between components is shown for purposes of brevity, one of ordinary skill in the art will appreciate that any reasonable number of data connections, or "paths" may be found in a particular system or scenario in which data is transferred. These paths form the multipath architecture of storage networks in which the mechanisms of the present invention are concerned, among other aspects. In addition, alternate network paths appreciated by one of ordinary skill in the art may be found.

The system memory 243 of the storage controller 136 stores program instructions and data, which the processor 242 may access for executing functions and method steps of the present invention for executing and managing the storage devices 246 as described herein. In one embodiment, the system memory 243 includes, is in association with, or is in communication with, the operation software 250 for performing methods and operations described herein. As shown in FIG. 2, the system memory 243 may also include or be in communication with a cache 245 for storage 230, also referred to herein as a "cache memory", for buffering "write data" and "read data", which respectively refer to write/read requests and their associated data. In one embodiment, the cache 245 is allocated in a device external to the system memory 243, yet remains accessible by the microprocessor 242 and may serve to provide additional security against data loss, in addition to carrying out the operations as described in herein.

In some embodiments, the cache 245 is implemented with a volatile memory and nonvolatile memory and coupled to the microprocessor 242 via a local bus (not shown in FIG. 2) for enhanced performance of the data storage system 200.

The NVS 216 included in the storage controller 136 is accessible by the microprocessor 242 and serves to provide additional support for operations and execution of the present invention as described in other figures. The NVS 216, may also referred to as a "persistent" cache, or "cache memory" and is implemented with nonvolatile memory that may or may not utilize external power to retain data stored therein. The NVS 216 may be stored in and with the cache 245 for any purposes suited to accomplish the objectives of the present invention. In some embodiments, a backup power source (not shown in FIG. 2), such as a battery, supplies the NVS 216 with sufficient power to retain the data stored therein in case of power loss to data storage system 200. In certain embodiments, the capacity of the NVS 216 is less than or equal to the total capacity of the cache 245. Buffers 244 assist the cache 245 to read and write data, and a control switch 241 controls a protocol to control data transfer to or from the storage devices 246, the hosts 102, and other components in the storage controller 105. Multiple buffers 244 may be implemented with the present invention to assist with the operations as described herein.

The storage devices 246 may be physically comprised of one or more storage devices, such as storage arrays. A storage array is a logical grouping of individual storage devices, such as a hard disk. In certain embodiments, the storage devices 246 are comprised of a JBOD (Just a Bunch of Disks) array or a RAID (Redundant Array of Independent Disks) array. A collection of physical storage arrays may be further combined to form a rank, which dissociates the physical storage from the logical configuration. The storage space in a rank may be allocated into logical volumes, which define the storage location specified in a write/read request.

The storage controller 136 is configured to use the processor 242 cores to process host 122 IO operations in parallel for improved performance. IO operations may arrive in any order and overlap in terms of virtual disks 249 that the IO operations access. To overcome issues related to overlapping IO operations, virtual disks 249 are assigned to different cores of the processor 242. For example, a four-core processor 242 may have sixteen virtual disks 249 which are presented to the host 122. The host 122 utilizes "striping" in which a logical volume 202 is created which appears to the host operating system as a single disk, but in reality, spreads data evenly across the provided set of virtual disks 249 of the storage controller 136. In some examples, the host 122 creates stripes with a predefined stripe size of, for example, 1 MB. In the depicted example, each stripe 203 is depicted with a different pattern, however for the sake of clarity, each stripe is not identified with a reference number. The pattern of each of the stripes 203 corresponds to one of the virtual disks 249 of the storage controller 136. As illustrated, the data of a virtual disk 249 is spread across one or more physical disks 246 (corresponding hatching patterns of Virt Disk 0 249 are shown in each of the columns that represent a physical disk 246, of which ten are depicted). Spreading the data of a virtual disk across one or more physical disks 246 improves performance and provides fault tolerance via RAID algorithms.

Striping achieves efficient use of the storage controller resources, however, current storage controllers are limited in that the number of virtual disks and the stripe size are determined at initialization and are static (i.e., a fixed stripe size). Previous storage controllers manage or determine storage capacity using a "worst stripe" accounting method where the data usage (i.e., how much data is written to the stripe) of the "worst stripe" is used to calculate the storage capacity of the entire system. A "worst stripe" is the stripe with the highest storage utilization. Current storage controllers, therefore, often vastly overestimate the storage utilization of the cluster system using the worst stripe method, and thereby leave large amounts of available storage unused. Beneficially, the storage controller 136 of the present disclosure overcomes this issue by calculating free space of a stripe (instead of space used) and dynamically balancing storage capacity (i.e., stripe sizes may be altered by allocating free space). The storage controller 136 is configured to dynamically alter stripe sizes to compensate for unbalanced data distribution. The storage controller 136 is also configured to dynamically allocate capacity to stripes. This allows for the full usage of storage capacity and also corrects an issue where a data reduction ratio was incorrectly determined based on the overestimated storage capacity.

The storage controller 136 may include operation software 250, a usage manager 252, a map generator 254, and a balancer 256. The operation software 250, usage manager 252, map generator 254, and the balancer 256 may work in conjunction with each and every component of the storage controller 136, the host 122, and the storage devices 246. The operation software 250, usage manager 252, map generator 254, and the balancer 256 may be structurally one complete module or may be associated and/or included with other individual modules. They may also be located in the cache 245 or other components of the storage controller 136.

The operation software 250, usage manager 252, map generator 254, and the balancer 256 may individually and/or collectively perform various aspects of the present invention as will be further described. For example, the operation software 250 may contain executable code for performing free storage capacity calculation and stripe balancing. In certain embodiments, the usage manager 252, map generator 254, and the balancer 256 are part of the operating software 250 and perform the functions of determining a free storage capacity and of balancing free storage capacity among stripes.

In one embodiment, the usage manager 252 is configured to calculate free space of stripes, as opposed to the typically used method of used space based on the "worst stripe" method. In such a reversed accounting method, the usage manager 252 identifies the stripe with the minimal amount of free capacity to calculate the amount of free capacity in the system. The total capacity of the system may be derived from the amount of free capacity.

In certain embodiments, the usage manager 252 is configured to calculate a score (i.e., a weight) for each stripe based on a movable and a non-movable free capacity of the stripe. A stripe with a higher score is a likely potential capacity contributor (or donator) to other stripes. As discussed above, in embodiments of the present disclosure, unlike previous cluster or storage controllers, the storage controller 136 is configured to dynamically alter stripe sizes by allocating free space from a stripe with a high score to one with a low score. In certain embodiments, the score is a tally of storage units that are free, where each storage unit is a fixed size.

The map generator 254 is configured to create and maintain a view/map of all stripes. In certain embodiments, the map generator 254 sorts and arranges the stripes in the map based on the scores of the stripes. For example, and as will be described below in greater detail, the stripes are sorted in either a descending or ascending fashion based on the calculated free-space score. The map generator is also configured to maintain a plurality of indicators that identify specific stripes (see FIG. 3).

Once sorted, the balancer 256 is configured to reallocate movable free capacity between the various stripes which belong to the cluster system 134. The steps performed by the balancer 256 are described below with reference to FIG. 6. In certain embodiments, the balancer 256 is configured to reallocate a storage unit from a stripe that is selected to be a donor to a stripe that is selected to be a recipient.

In view of the exemplary hardware structures depicted in FIGS. 1 and 2 previously, the mechanisms of the present invention may, as one of ordinary skill in the art will appreciate, be implemented and/or utilized in a wide variety of physical locations including, but not limited to Host-Bus Adapters (HBAs), Converged Network Adapters (CNAs), switch ports, storage ports, and the like. The mechanisms of the illustrated embodiments, among other functionality, implement new methodologies to ensure data is not corrupted by misconfigured host applications, storage drivers, filesystem control software, or other general operating system issues. Critical sections residing within the storage volumes or devices that have a mandatory atomic-write indicator can no longer be overwritten by a non-atomic method.

Figure 3:
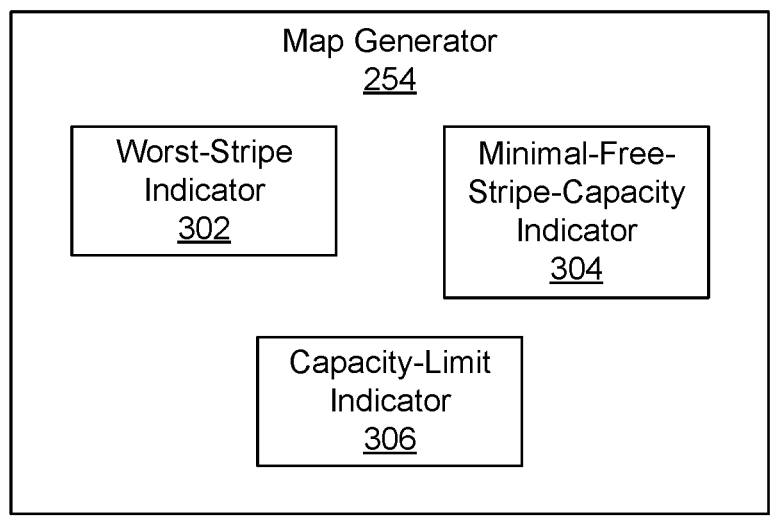
FIG. 3 is a schematic block diagram illustrating one embodiment of a map generator in accordance with embodiments of the present disclosure.

FIG. 3 is a schematic block diagram illustrating one embodiment of a map generator in accordance with embodiments of the present disclosure. The map generator 254, as described above, is configured to generate a stripe map at system initialization and maintain and update the stripe map as the cluster system processes IO operations. In other words, the first time the cluster system 134 is initialized, and before the cluster system 134 begins to process IO operations, the map generator 254 creates a map of stripe free-space scores. Additionally, the map generator 254 is configured to update the map continuously throughout execution of IO operations (i.e., read and/or write operations) and during a balancing operation executed by the balancer 256.

In certain embodiments, the map generator 254 also maintains indicators for aiding the balancer 256 in selecting which stripe is to be a donor stripe and which stripe is to be selected as a receiver stripe. These indicators may include a worst-stripe indicator 302, a minimal-free-stripe-capacity indicator 304, and a capacity-limit indicator 306.

The worst-stripe indicator 302 identifies, in a sorted stripe map, the last stripe which has the lowest score. As mentioned previously, the stripe score may be based on a movable free-space capacity and a non-movable free-space capacity. Non-movable free-space capacity may be the result of a physical or architecture limitation of the cluster system. For example, if part of the capacity is managed by a sub-component of the cluster system which may not be aware of the stripe-balancing capabilities of the cluster system, that capacity may be considered non-movable. Each stripe may have a quantity of non-movable free-space capacity.

The minimal-free-stripe-capacity indicator 304 is configured to identify the stripe with the lowest score (e.g., last stripe in a sorted map), with movable free-space capacity. Any stripe with a lower score is not considered to be eligible to be elected as a donor stripe. Similarly, from a different perspective when considering the sorted map, the minimal-free-stripe-capacity indicator 304 identifies the first stripe with a score sufficient to be considered as a potential donor stripe.

The capacity-limit indicator 306 is configured to identify the first stripe which can accept additional free-space capacity and is therefore eligible to be selected as a receiving stripe. In additional embodiments, the capacity-limit indicator 306 identifies the first stripe in the stripe map that can accept additional free-space capacity in the cluster system. In other embodiments, where there may be multiple stripes with the lowest score, the balancer 256 may be configured to only reallocate free-space capacity to stripes which are beyond (i.e., when considering a sorted map, to one side of the capacity-limit indicator) the capacity-limit indicator 306.

Figure 4A:
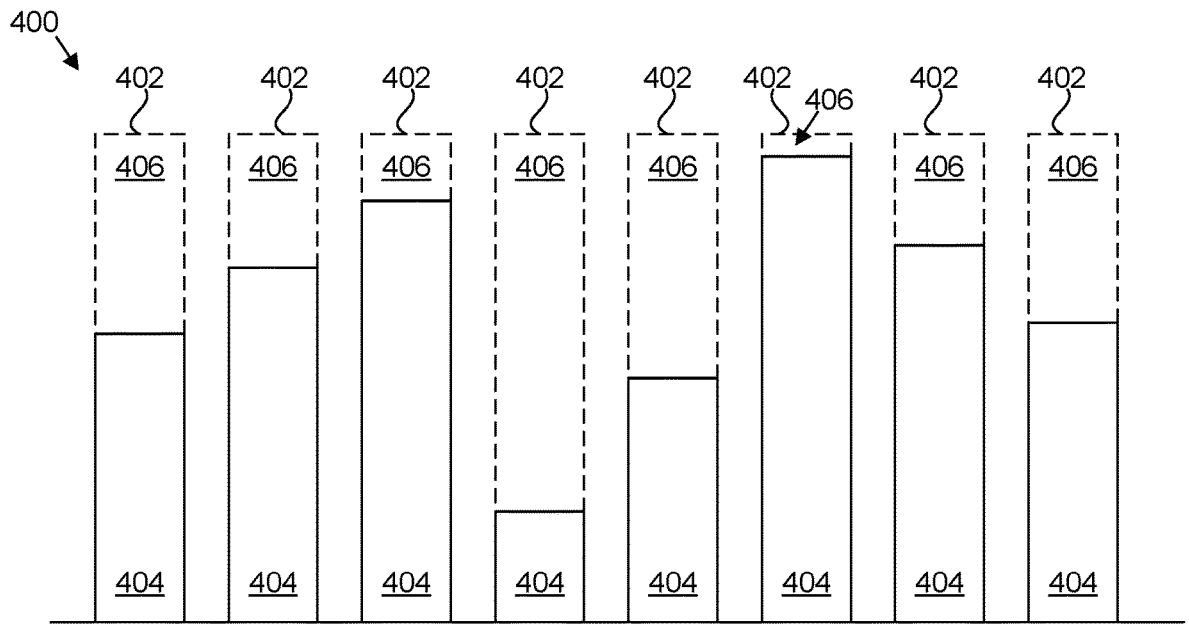
FIGS. 4a, 4b, and 4c are block diagrams illustrating embodiments of a stripe map in accordance with embodiments of the present disclosure.
Figure 4B:
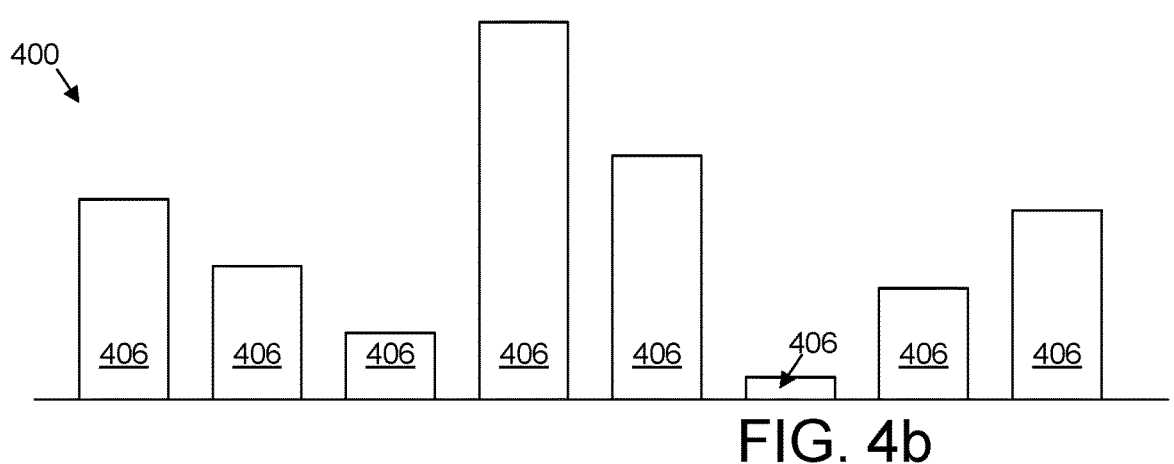
Figure 4C:
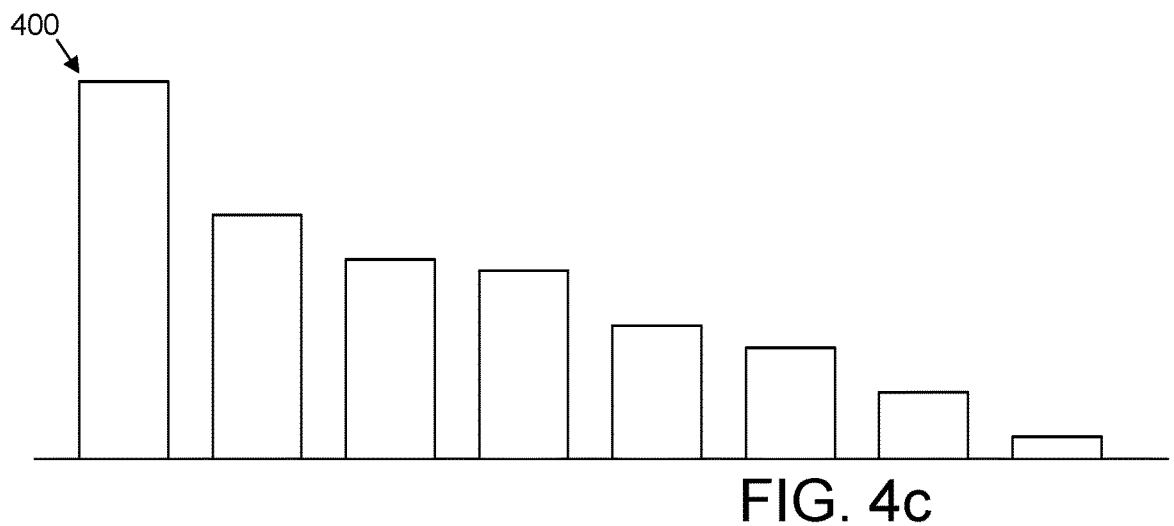

FIGS. 4a, 4b, and 4c are block diagrams illustrating embodiments of a stripe map 400 in accordance with embodiments of the present disclosure. In particular, FIG. 4a is a graphical representation of a stripe 402 that includes a utilized portion 404 and a free portion 406. The map generator 254 is configured to maintain a stripe map of free-space capacity, as depicted in FIGS. 4b and 4c.

The height of each free portion 406 is representative of the stripe score described above. The map generator 254 is also configured to sort the stripe map 400, as depicted in FIG. 4c, from largest score to smallest score. The generation and sorting of the stripe map 400 may occur during an initialization sequence of the cluster system, or periodically as may be required or defined by an administrator.

Figure 5A:
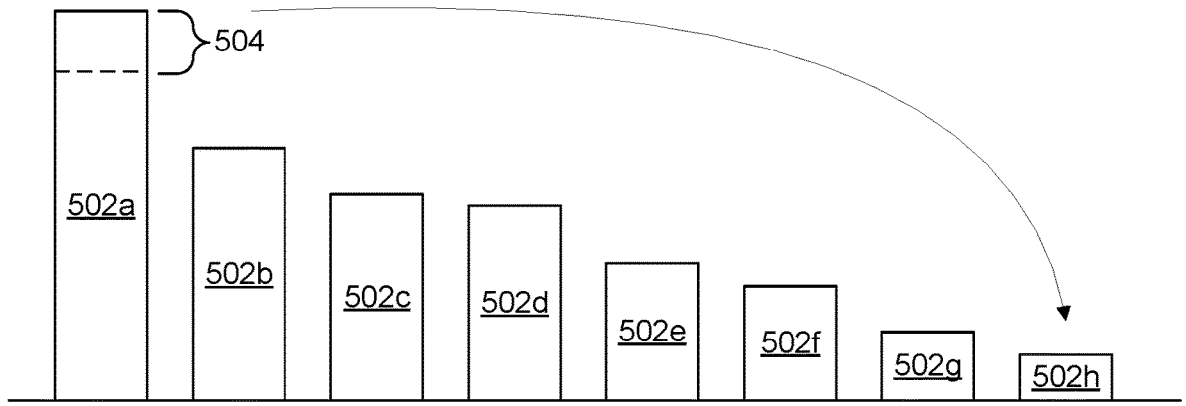
FIGS. 5a and 5b are block diagrams illustrating embodiments of stripe maps in accordance with embodiments of the present disclosure.
Figure 5B:
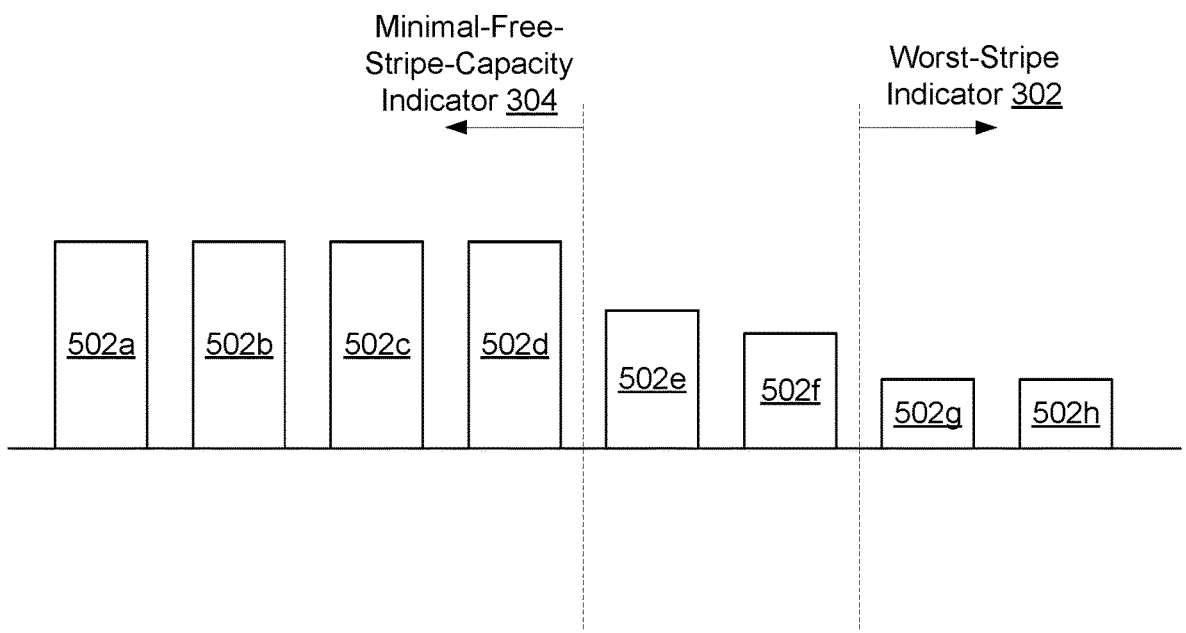

FIGS. 5a and 5b are block diagrams illustrating embodiments of stripe maps in accordance with embodiments of the present disclosure. Although the discussion herein refers to "first" and "last" stripes with relation to the maps of FIGS. 5a and 5b, it is to be understood that the stripe maps may be sorted or arranged in manners different than the depicted left-to-right descending stripe map. In other words, "first" and "last" are relative to the particular implementation, which may be sorted in a different manner, for example, an ascending sorted map.

In particular, FIG. 5a graphically conveys the reallocation of free-space storage unit from a first stripe 502a to a second stripe 502h. Following the reallocation of a storage unit 504 from one stripe to another stripe, the balancer 256 is configured to resort the stripe map 500 if necessary. In the depicted embodiment, reallocation of the storage unit 504 may trigger a resorting that results in the swapping of stripe 502h with 502g.

As described above, the map generator 254 maintains a worst-stripe indicator 302 configured to identify the first stripe which has the lowest score. For example, if considered graphically, the stripe map may be viewed as having stripes sorted in a descending manner from the stripe with the greatest score to the lowest score. If multiple stripes (e.g., 502g and 502h) have the same score, the worst stripe indicator 302 may indicate the first of these stripes with the worst score. In the depicted embodiment, every stripe to the right of the worst-stripe indicator 302 is considered a "worst stripe."

The map generator 254 also maintains the minimal-free-stripe-capacity indicator 304, which is configured to identify the first stripe that does not have a minimal amount of free-space storage units for reallocation. In the depicted embodiment, the minimal-free-stripe-capacity indicator 304 is positioned adjacent stripe 502e, which does not have a score sufficient to be considered a donator. Any stripe to the left of the indicator 304 may be considered a donator, while stripes 502e and 502f are not "worst stripes," they do not have a score suitable to be considered eligible to be elected as a donator stripe.

Figure 6:
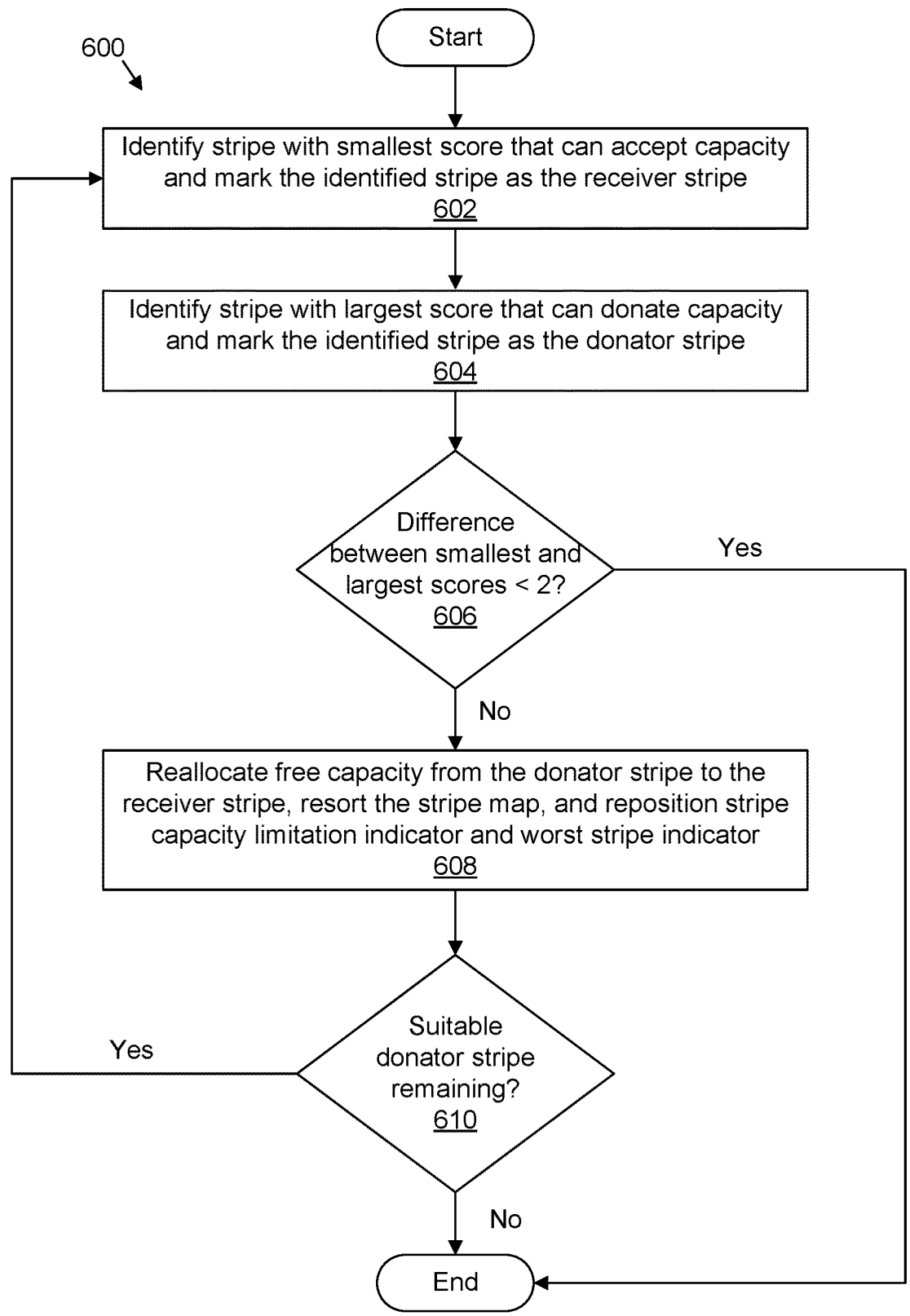
FIG. 6 is a flowchart diagram illustrating one embodiment of a method 600 for dynamic capacity allocation of stripes in cluster-based storage systems.

FIG. 6 is a flowchart diagram illustrating one embodiment of a method 600 for dynamic capacity allocation of stripes in cluster-based storage systems. In other words, the method 600 depicts the steps which may be performed to reallocate free-space capacity from a donator stripe to a receiver or recipient stripe. The method 600 may be performed by processing logic that may comprise hardware (e.g., circuitry, dedicated logic, programmable logic, microcode, etc.), software (such as instructions run on a processing device), firmware, or a combination thereof. In one embodiment, the method 600 is performed by the storage controller 136.

The method 600 starts and the processing logic, at block 602 identifies the stripe with the smallest score that can accept capacity and marks the identified stripe as the receiver stripe. In certain embodiments, the processing logic identifies the first stripe with the smallest score with the worst-stripe indicator. At block 604, the processing logic identifies the stripe with the largest score that can donate capacity and marks the identified stripe as the donator stripe.

At decision block 606, the processing logic determines if the difference between the smallest score and the largest score is less than a predetermined threshold. In certain embodiments, where the score represents a number of storage units, the predetermined threshold may be 2 storage units. In this example, if the difference between the scores is less than 2, the method 600 ends. Otherwise, the processing logic, at block 608, reallocates free capacity from the donator stripe to the receiver stripe and sorts the stripe map. Additionally, the processing logic analyzes the stripe map to determine new positions for the different indicators. The processing logic then determines, at decision block 610, if there are any remaining stripes that may be suitable for selection as a donator stripe. If the determination is positive, the processing logic returns to block 602. If the determination is negative, the method 600 ends.

In certain embodiments, if the cluster-based storage system detects that there is no free-space capacity, it may delay IO requests until the processing logic can reallocate additional capacity to the stripe targeted by the IO request. If the processing logic determines that there are no suitable donator stripes, the processing logic may mark the cluster-based storage system as fully utilized.

Figure 7:
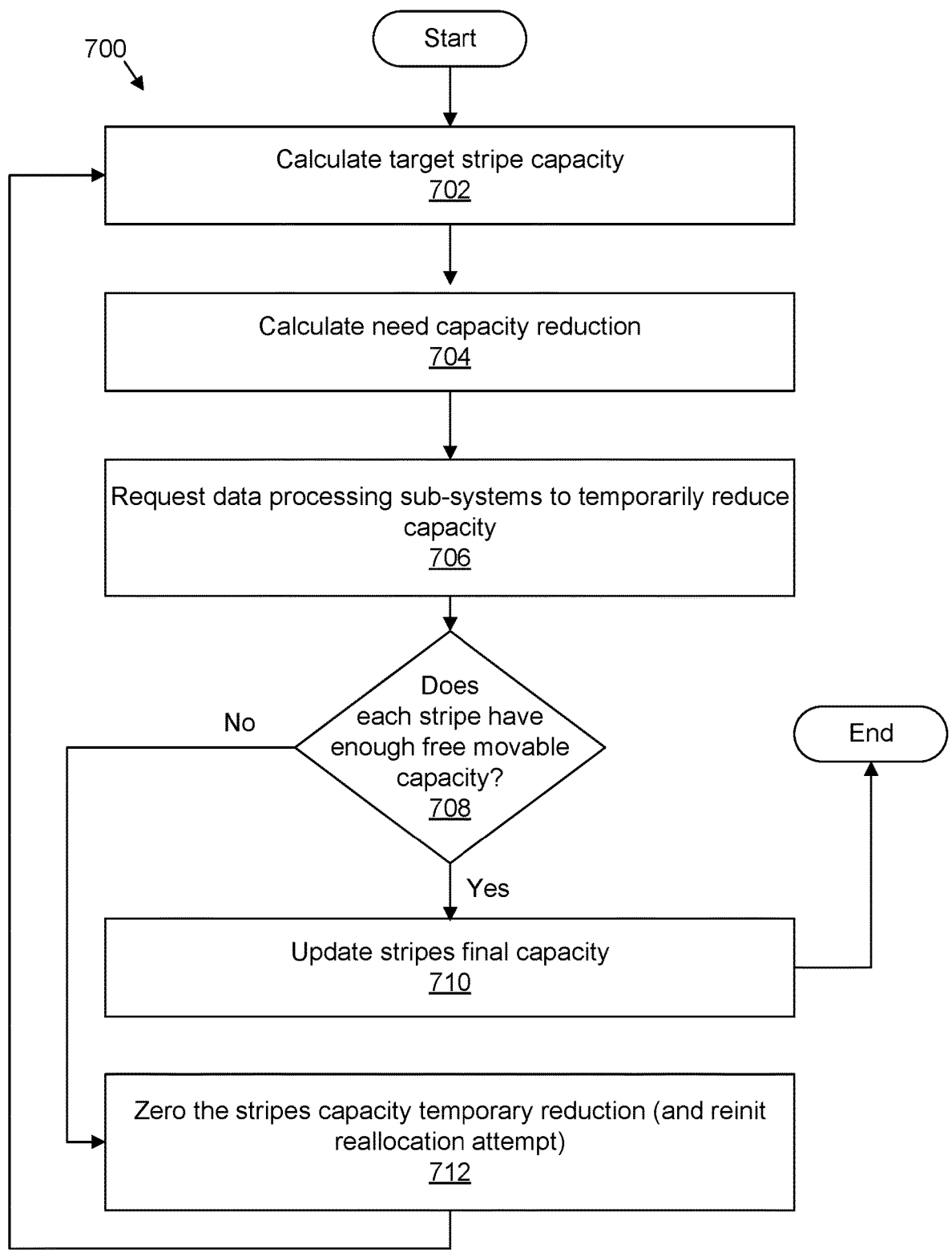
FIG. 7 is a flowchart diagram illustrating one embodiment of a method for reducing or increasing the free-space capacity of stripes.

FIG. 7 is a flowchart diagram illustrating one embodiment of a method 700 for reducing or increasing the free-space capacity of stripes. The method 700 may be performed by processing logic that may comprise hardware (e.g., circuitry, dedicated logic, programmable logic, microcode, etc.), software (such as instructions run on a processing device), firmware, or a combination thereof. In one embodiment, the method 600 is performed by the storage controller 136.

The method 700 starts and the processing logic, at block 702, calculates a target stripe capacity. At block 704, the processing logic calculates a "need capacity" reduction, and requests that the various processing sub-systems temporarily reduce capacity, at block 706. If the processing logic determines, at block 708, that each donator stripe has enough free movable capacity to donate, the processing logic updates the final free-space capacity of each stripe (i.e., decrease or increase), at block 710 and the method 700 ends. If not, the processing logic, at block 712, discards or zeroes out the temporary reduction and reinitializes a reallocation attempt.

Figure 8A:
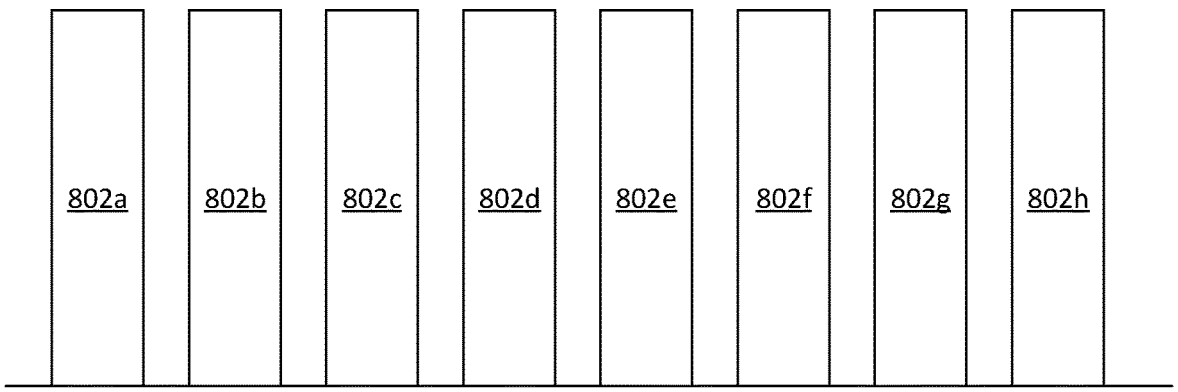
FIGS. 8a, 8b, and 8c are schematic block diagrams illustrating how writes to a system with a free-capacity stripe map are processed, in accordance with embodiments of the present disclosure.
Figure 8B:
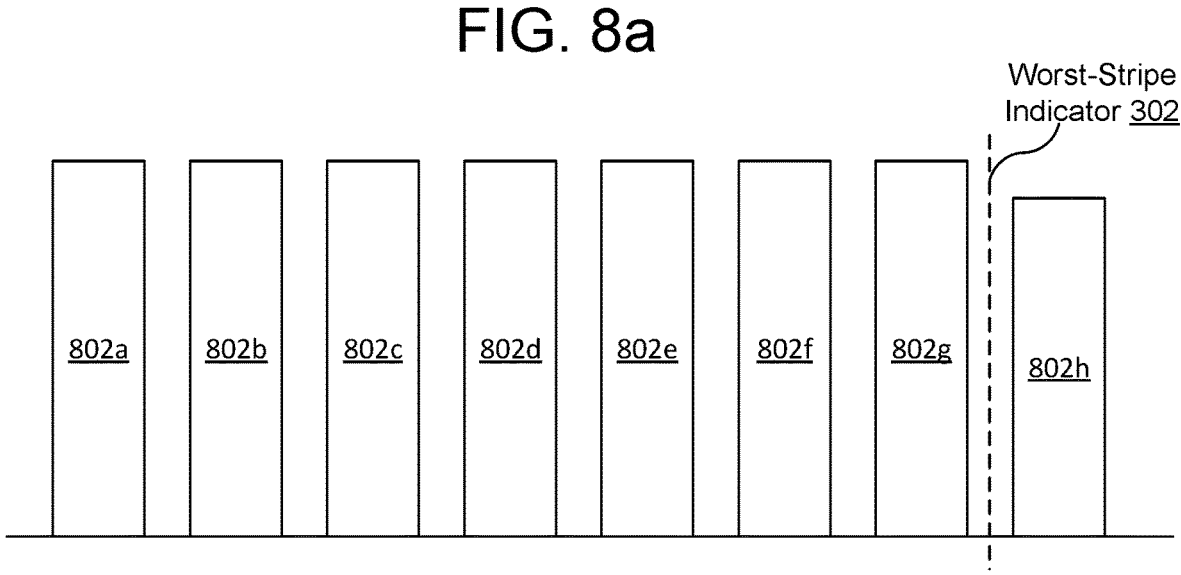
Figure 8C:
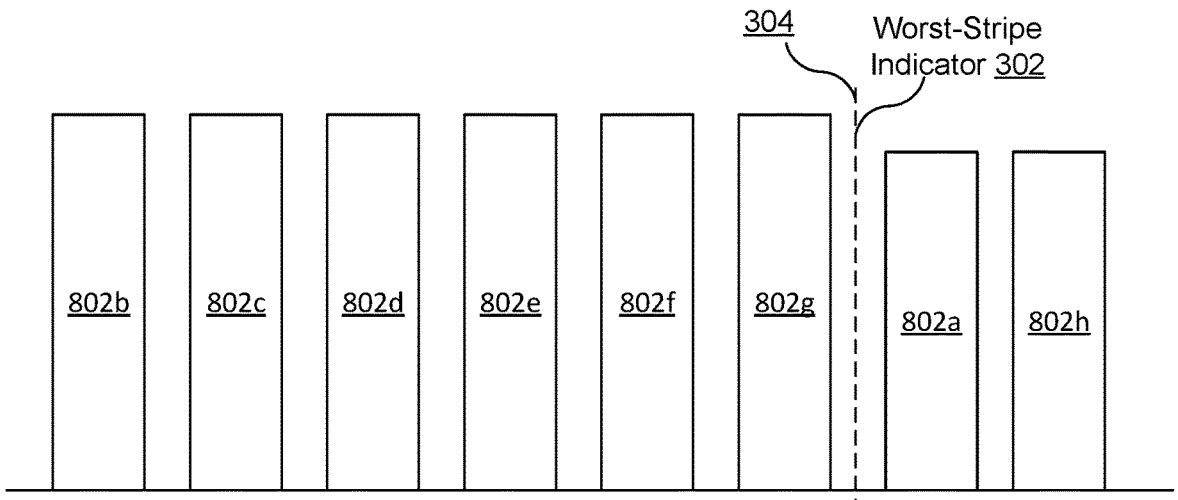

FIGS. 8a, 8b, and 8c are schematic block diagrams illustrating how writes to a system with a free-capacity stripe map are processed, in accordance with embodiments of the present disclosure. In particular, FIG. 8a depicts a stripe map at the time of initialization before any write operations have been processed. In such a situation, the free-space capacity of each stripe 802a-802h is substantially equivalent, as depicted. After data is written to a first data unit (or storage unit) to stripe 802h, the free-space capacity of stripe 802h is reduced by one storage unit, as depicted in FIG. 8b. The map generator updates the stripe map and identifies stripe 802h as the worst stripe with a worst-stripe indicator 302. As discussed above, a reallocation, or balancing operation, may not be executed because the difference in score between the worst stripe 802h and any of possible donator stripes is less than two. The overall system free capacity at this point is reduced by one storage or data unit.

FIG. 8c depicts the stripe map after a second write operation has been executed to a second storage unit of stripe 802h and the map generator has reallocated and resorted the stripe map. The difference between 802h and the stripe with the greatest score is now two and so a balancing operation may be executed. The balancer 256 reallocates, for example, one free-space capacity unit from stripe 802a to stripe 802h. The stripes 802a, 802h now have equivalent free-space capacities, and the map generator 254 resorts the stripe map by positioning the stripe 802a adjacent stripe 802h. The worst-stripe indicator 302 is also re-positioned to indicate the first worst stripe in the descending sorted stripe map. As the remaining stripes have substantially equivalent free-space capacity, the minimal-free-space-capacity indicator 304 is also in the same position as the indicator 302. In other words, when viewing the map from the greatest score to the worst score (i.e., from left to right), the worst-stripe indicator 302 identifies the first stripe that is encountered (802a) with the worst score. As both 802a and 802h have the same score, 802a is the first stripe encountered with the "worst score."

Alternatively, the indicators 302, 304 may not ever reach the same position. For example, during a balancing operation, only a portion of a storage unit may be reallocated from a donator stripe to a receiver stripe, and a capacity allocation may be calculated before continuing the balancing operation. Such an approach enables a more fine-tuned balancing process. The balancing operation ends, as described above, when potential donator stripes are no longer found.

The embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
one or more processors;
one or more non-transitory computer-readable storage media, the one or more non-transitory computer readable storage media comprising executable code, that when executed by the one or more processors, causes the one or more processors to:
identify a storage stripe in a cluster-based storage system having a smallest stripe score of a plurality of storage stripes;
identify a storage stripe in the cluster-based storage system having a largest stripe score of the plurality of storage stripes; and
reallocate, in response to a difference between the largest stripe score and the smallest stripe score being greater than or equal to a threshold value, free-space capacity from a donator stripe to a receiver stripe.

2. The apparatus of claim 1, where the executable code further causes the one or more processors to generate a stripe score for each of the plurality of storage stripes.

3. The apparatus of claim 2, where the stripe score of each of the plurality of storage stripes is based on a quantity of movable free-space capacity and non-movable free-space capacity.

4. The apparatus of claim 3, where the stripe score is a quantity of storage units.

5. The apparatus of claim 4, where the threshold value is two.

6. The apparatus of claim 1, where the executable code further causes the one or more processors to generate and sort a stripe map comprising a plurality of stripe scores, where each of the plurality of stripe scores corresponds to one of the plurality of storage stripes.

7. The apparatus of claim 6, where the executable code further causes the one or more processors to maintain a worst-stripe indicator that identifies a first stripe in the stripe map having the smallest stripe score.

8. The apparatus of claim 6, where the executable code further causes the one or more processors to maintain a minimal-free-stripe-capacity indicator that identifies a first stripe that is suitable to be selected as a donator stripe in response to the first stripe having movable free-space capacity.

9. The apparatus of claim 6, where the executable code further causes the one or more processors to maintain a capacity-limit indicator that identifies a first stripe in the stripe map that is suitable to be selected as a receiver stripe.

10. A method comprising:
identifying a storage stripe in a cluster-based storage system having a smallest stripe score of a plurality of storage stripes;
identifying a storage stripe in the cluster-based storage system having a largest stripe score of the plurality of storage stripes; and
reallocating, in response to a difference between the largest stripe score and the smallest stripe score being greater than or equal to a threshold value, free-space capacity from a donator stripe to a receiver stripe.

11. The method of claim 10, where the method further comprises generating a stripe score for each of the plurality of storage stripes.

12. The method of claim 11, where the stripe score of each of the plurality of storage stripes is based on a quantity of movable free-space capacity and non-movable free-space capacity.

13. The method of claim 12, where the stripe score is a quantity of storage units.

14. The method of claim 13, where the threshold value is two.

15. The method of claim 10, further comprising generating and sorting a stripe map comprising a plurality of stripe scores, where each of the plurality of stripe scores corresponds to one of the plurality of storage stripes.

16. The method of claim 15, further comprising maintaining a worst-stripe indicator that identifies a first stripe in the stripe map having the smallest stripe score.

17. The method of claim 15, further comprising maintaining a minimal-free-stripe-capacity indicator that identifies a first stripe that is suitable to be selected as a donator stripe in response to the first stripe having movable free-space capacity.

18. The method of claim 15, maintaining a capacity-limit indicator that identifies a first stripe in the stripe map that is suitable to be selected as a receiver stripe.

19. A computer program product, the computer program product comprising a non-transitory computer readable storage medium having program instructions embodied therewith, the program instructions readable/executable by a processor to cause the processor to:
identify a storage stripe in a cluster-based storage system having a smallest stripe score of a plurality of storage stripes;
identify a storage stripe in the cluster-based storage system having a largest stripe score of the plurality of storage stripes; and
reallocate, in response to a difference between the largest stripe score and the smallest stripe score being greater less than or equal to a threshold value, free-space capacity from a donator stripe to a receiver stripe.

20. The computer program product of claim 19, where the program instructions cause the processor to generate and sort a stripe map comprising a plurality of stripe scores, where each of the plurality of stripe scores corresponds to one of the plurality of storage stripes.

* * * * *